United States Patent [19]
Tsinberg et al.

[11] Patent Number: 5,619,335
[45] Date of Patent: Apr. 8, 1997

[54] DIGITAL VIDEO RECORDING AND PLAYBACK SYSTEM AND METHOD HAVING MULTIPLE PLAYBACK DEVICES OUTPUTTING VIDEO PROGRAM DATA ON MULTIPLE CHANNELS

[75] Inventors: Mikhail Tsinberg, Riverdale, N.Y.; Shigeo Ogawa, Robbinsville, N.J.

[73] Assignee: Kabushiki Kaisha Toshiba, Kanagawa-ken, Japan

[21] Appl. No.: 127,511

[22] Filed: Sep. 28, 1993

[51] Int. Cl.$^6$ .............................. H04N 5/76; H04N 5/92
[52] U.S. Cl. ........................................... 386/125
[58] Field of Search .................... 358/335, 310, 358/342; 348/703, 6, 7, 8; 360/33.1, 35.1, 61; H04N 5/76, 5/781, 5/78, 5/782, 5/783, 5/92, 9/79, 5/268

[56] References Cited

U.S. PATENT DOCUMENTS

| | | | |
|---|---|---|---|
| 4,315,276 | 2/1982 | Harada et al. | |
| 4,468,710 | 8/1984 | Hashimoto et al. | |
| 4,764,812 | 8/1988 | Hamley | 348/705 |
| 4,949,179 | 8/1990 | Hosono | 348/705 |
| 5,162,903 | 11/1992 | Ogino et al. | 348/705 |
| 5,172,242 | 12/1992 | Yamaguchi et al. | |
| 5,187,589 | 2/1993 | Kono et al. | |
| 5,216,552 | 6/1993 | Dunlap et al. | 348/705 |
| 5,231,512 | 7/1993 | Ebihara et al. | 348/705 |
| 5,343,193 | 8/1994 | Shoda et al. | 348/705 |
| 5,386,325 | 1/1995 | Kim | 358/335 |

FOREIGN PATENT DOCUMENTS

| | | |
|---|---|---|
| 0469804A2 | 7/1991 | European Pat. Off. |
| 0495480A3 | 1/1992 | European Pat. Off. |

OTHER PUBLICATIONS

Kiichi, Masumoto, "Video Reproducing System of Series Alternating Operation," Patent Abstracts of Japan, vol. 10, No. 12 (1986).
International Search Report, dated Jan. 19, 1995.

*Primary Examiner*—Thai Q. Tran
*Attorney, Agent, or Firm*—Finnegan, Henderson, Farabow, Garrett & Dunner, L.L.P.

[57] ABSTRACT

A digital video recording and playback system, and a method for recording video program information on a multiple-channel recording medium, such as tape. The system includes multiple playback devices, such as VCR decks. Each playback device outputs video program data from each of multiple channels of the recording medium at the same time. Synchronizing circuitry controls the playback devices so that alternately one is in playback mode while the other is in non-playback mode. The sequential outputs of the two playback devices can create a continuous and complete video program. One playback device is in playback mode while the other is rewinding. Because the video program data is recorded on the multiple channels with staggered starting times, little wait time occurs between the request for a program by a viewer and the start time of the program.

11 Claims, 4 Drawing Sheets

DIGITAL VIDEO RECORDING AND PLAYBACK SYSTEM AND METHOD HAVING MULTIPLE PLAYBACK DEVICES OUTPUTTING VIDEO PROGRAM DATA ON MULTIPLE CHANNELS

FIELD OF THE INVENTION

The field of the invention relates to digital video systems and methods. More specifically, it relates to digital video playback systems and methods capable of simultaneously playing back a plurality of programs, and to methods for recording multiple video channels on a digital recording medium.

BACKGROUND OF THE RELATED ART

It is commonplace today for commercial video broadcast systems to have user-selected programming in which the user may select a desired program or programs from a collection or menu of program options. The individual program subscription or "pay-per-view" services offered by many commercial broadcast cable companies are examples of systems having user-selected programming.

Video playback systems for providing such user-selected programming typically include a plurality of video cassette recorder decks (VCRs). Commonly, one VCR is provided for each program offered. Each VCR is coupled at its output to a multiplexer which multiplexes the video signals outputted by the respective VCRs onto a broadcast medium such as a coaxial transmission cable. The VCRs play back their respective programs at predetermined times and time intervals. A subscriber who wishes to view a particular program merely selects the program and starting time from the available options. The broadcast system then codes the broadcasted signal so that the program is provided on the subscriber's television (TV). From the user's perspective, these systems ideally offer a large selection of programs, with each program being offered at frequent start times so that the maximum wait time for the start of the program is short.

The most widely used commercially-available VCR playback systems have been limited in that each VCR is capable of playing back only one program at a time. Therefore, one VCR is required for each channel on which programming is to be offered. Multi-channel programming often is a commercial necessity, which has meant that the system must include several VCRs. This has been disadvantageous both in terms of the cost of the VCRs and in terms of the logistics of system operation.

These commercial systems also have been limited because each channel must have idle times when the recording tape is being rewound. During rewinding, programming from the tape cannot be played back. For example, a system that broadcasts a particular 90-minute program and that takes five minutes to rewind can play back that program on a given channel no more frequently than every 95 minutes.

OBJECTS OF THE INVENTION

Accordingly, an object of the invention is to provide a digital video playback system and method capable of simultaneously and continuously playing back a plurality of programs.

Another object of the invention is to provide a digital video playback system and method capable of simultaneously and continuously playing back a plurality of programs, where the system and method require relatively few playback machines or devices.

Another object of the invention is to provide a digital video playback system and method capable of simultaneously and continuously playing back a plurality of programs, where the system is relatively inexpensive to produce and the method is relatively inexpensive to implement.

Still another object of the invention is to provide a digital video playback system and method capable of simultaneously and continuously playing back a plurality of programs, where the system and method reduce or eliminate idle times attributable to tape rewinding.

SUMMARY OF THE INVENTION

To achieve the foregoing objects of the invention, and in accordance with the purposes of the invention as embodied and broadly described in this document, a digital video playback system and method are provided for simultaneous playback of a plurality of programs. In addition, a recording method is provided for recording multiple channels of data on a digital recording medium.

The playback system of the invention comprises a first programming source, such as a digital VCR, for outputting a first digital signal when the first programming source is in a playback state, and a second programming source, such as a second digital VCR, for outputting a second digital signal when the second programming source is in a playback state. The first digital signal comprises a plurality of channels, and the second digital signal comprises a plurality of channels corresponding to the first digital signal channels. Selected ones of the first digital signal channels include a first source program segment, and selected ones of the second digital signal channels corresponding to the selected first digital signal channels include a second source program segment. For each of the selected corresponding first and second digital signal channels, the first and second source program segments, when played back sequentially, produce a continuous output signal corresponding to a continuous playback of one of the programs. The system further includes control means operatively coupled to the first and second programming sources for alternately switching the first and second programming sources between a first mode and a second mode. In the first mode, the first programming source is in the playback state and the second programming source is in a non-playback state. In the second mode, the first programming source is in a non-playback state and the second programming source is in the playback state. The control means preferably includes synchronizing means for synchronizing at least one of the first and second digital signals relative to one another during the switching between the first and second modes.

The digital video playback method includes a first step of outputting a first digital signal from a first programming source when the first programming source is in a playback state. The first digital signal comprises a plurality of channels. Selected ones of the first digital signal channels include a first source program segment. The playback method also includes a second step of outputting a second digital signal from a second programming source when the second programming source is in a playback state. The second digital signal comprises a plurality of channels corresponding to the first digital signal channels, and selected ones of the second digital signal channels corresponding to the selected first digital signal channels include a second source program segment. For each of the selected corresponding first and second digital signal channels, the first and second source program segments, when played back sequentially, produce a continuous output signal corresponding to a continuous playback of one of the programs. The playback method further includes a third step of alternately switching the first and second programming sources between a first mode and a second mode. In the first mode, the first programming source is in the playback state and the second programming source is in a non-playback state. In the second mode, the first programming source is in a non-playback state and the second programming source is in the playback state.

The recording method is useful for recording n channels of data on a digital recording medium that includes a plurality of frames, each of the frames including n channel slots. The recording method comprises a first step of recording a first channel $CH_i$ of data in a first channel slot of each of the frames of the recording medium. The index i indicates the channel number of interest. The recording method further includes a second step of recording a sequential one of the channels $CH_{i+1}$ of data in a sequential channel slot of each of the frames of the recording medium. This second step includes a first substep of reading the recording medium to obtain i previously recorded channels, a second substep of inserting the sequential channel $CH_{i+1}$ into the i previously recorded channels to obtain i+1 sequential channels, and a third substep of recording the i+1 sequential channels in the corresponding i+1 sequential channel slots of the frames of the recording medium. The second step is repeated until all n channels have been recorded.

BRIEF DESCRIPTION OF THE DRAWINGS

The accompanying drawings, which are incorporated in and constitute a part of the specification, illustrate presently preferred embodiments and methods of the invention and, together with the general description given above and the detailed description of the preferred embodiments and methods given below, serve to explain the principles of the invention.

DETAILED DESCRIPTION OF THE PREFERRED EMBODIMENT AND METHODS

Figure 1A:
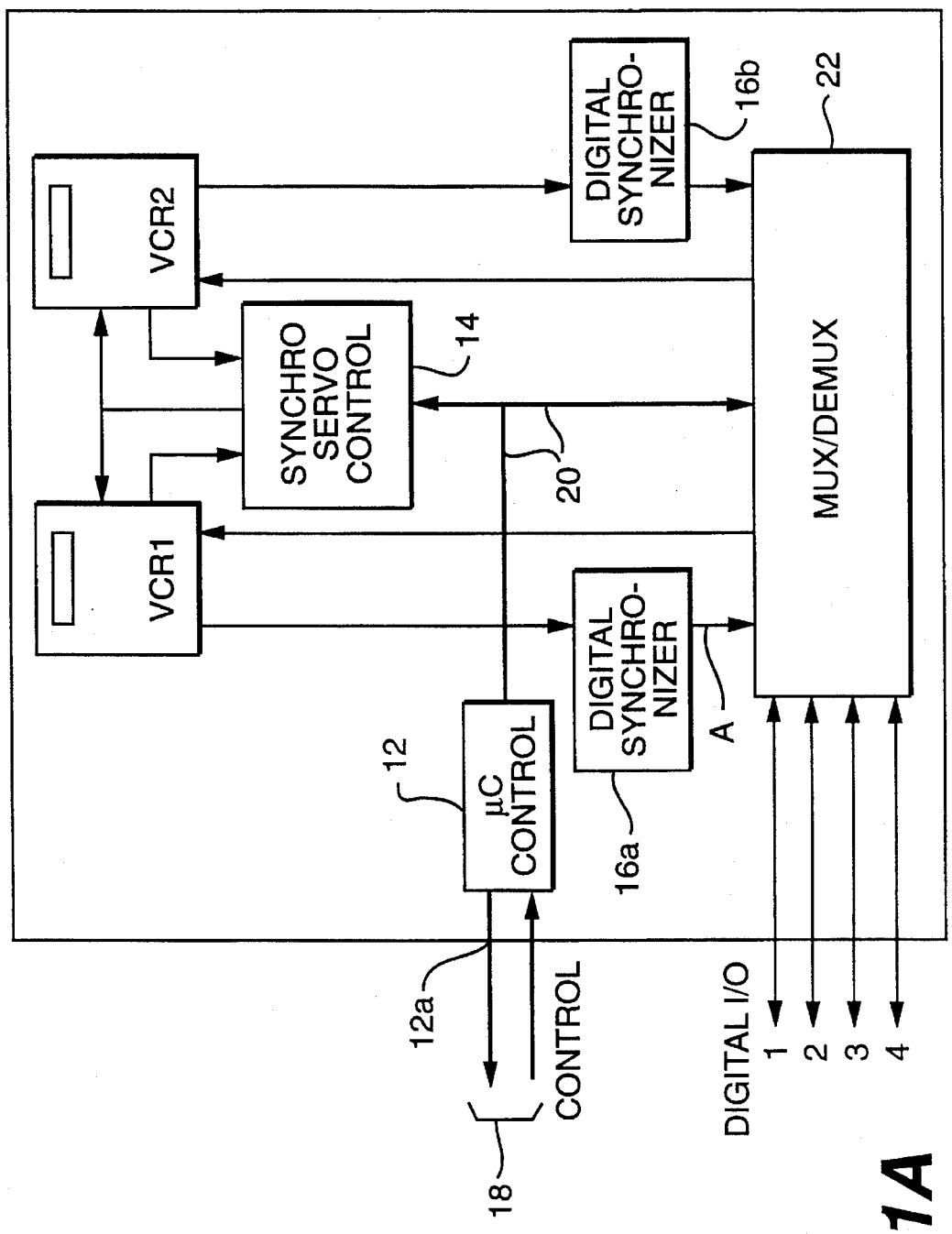
FIG. 1A is a hardware block diagram of a digital video system according to a preferred embodiment of the invention.

Reference will now be made in detail to the presently preferred embodiment and methods of the invention as illustrated in the accompanying drawings, in which like reference characters designate like or corresponding parts throughout the drawings.

In accordance with the invention, a digital video system is provided for simultaneous playback of a plurality of programs. A "program," as the term is used in this document, refers to the common but broad use of the term, for example, to refer to a continuous or semicontinuous video segment. Examples of programs include a motion picture or movie, a news or sports broadcast, and a show or segment from a serial video broadcast. "Playback," as the term is used in this document, is used according to its common meaning to refer, for example, to playing back a recorded video signal to reproduce the video and audio portions as respective images and sound on a TV. For example, a VCR plays back a recorded video signal to reproduce the audio and video portions as corresponding images and sound on a TV.

The system of the invention includes a first programming source for outputting a first digital signal when the first programming source is in a playback state, and a second programming source for outputting a second digital signal when the second programming source is in a playback state. The first and second programming sources may be any source for providing programming in digital electronic or optical form, such as a digital VCR deck, a video laser disk player, or the like. Preferably, the first and second programming sources comprise digital video cassette recorder devices.

Figure 1B:
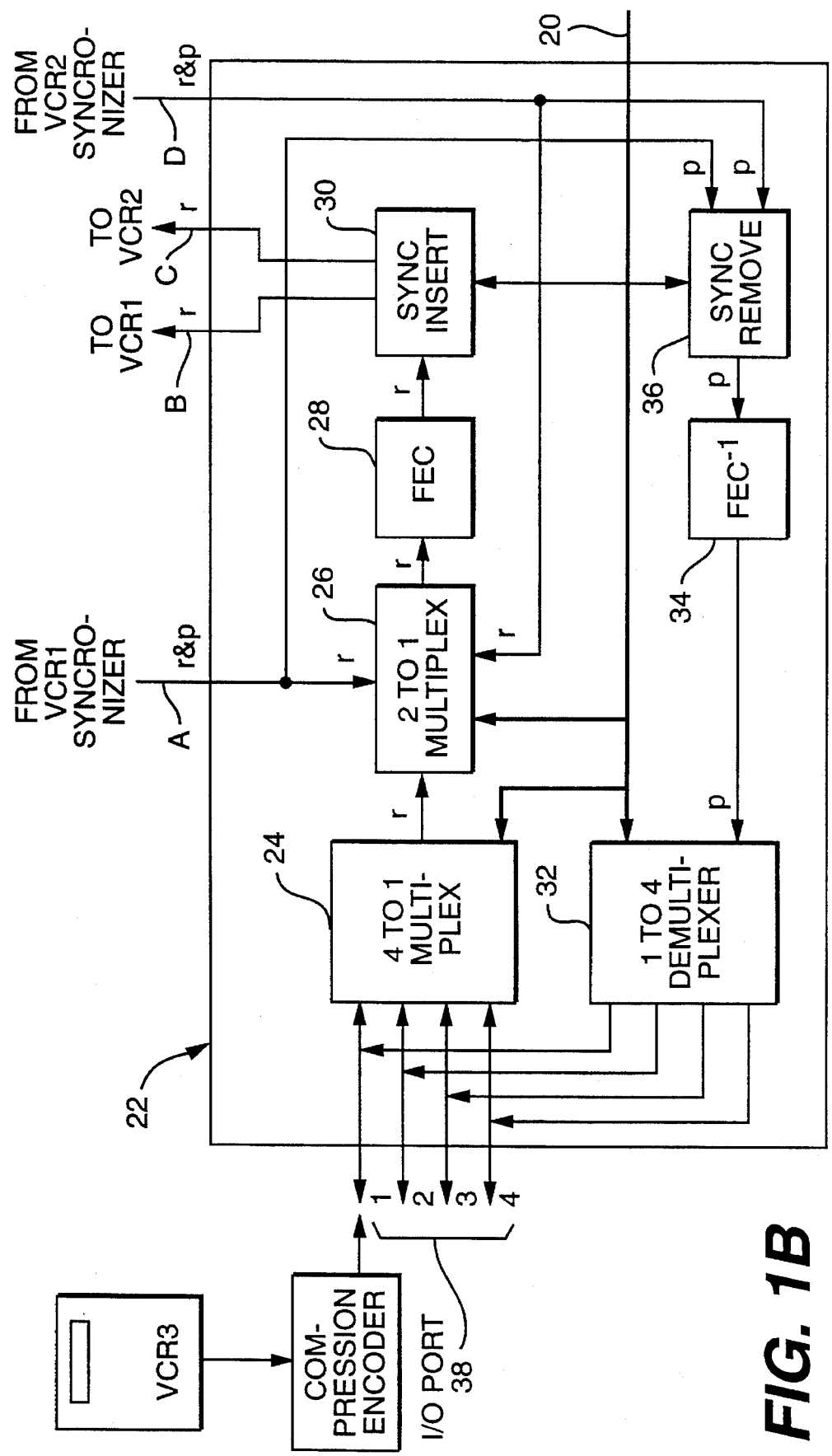
FIG. 1B is a block diagram showing additional details of the digital multiplexer/demultiplexer shown in FIG. 1A.

A digital video playback system 10 according to a presently preferred embodiment of the invention is shown in FIGS. 1A and 1B. In accordance with the preferred embodiment, and with reference to FIG. 1A, the first programming source comprises a digital VCR deck VCR1 capable of playing back digital video tapes having multi-channel programming. The Toshiba High Definition Digital VCR, Model HV-8900, marketed by Toshiba America Consumer Products, Inc., of Princeton, N.J., is an example of a presently preferred digital VCR for the first programming source.

The second programming source of the preferred embodiment comprises a second digital VCR deck VCR2 essentially identical to VCR1. VCR2 preferably is another Toshiba High Definition VCR Model HV-8900. VCR1 and VCR2 use digital video tapes (not shown) upon which multi-channel programming is recorded, and each VCR plays back video data at a rate of about 24 Mb/sec.

The "playback state" of VCR1 and VCR2 refers to a state in which the VCR reads the programming recorded on the video tape and outputs a corresponding digital video signal. The "non-playback state" refers to a state in which the VCR is not playing back recorded programming. During the non-playback state, the VCR may rewind the video tape to the beginning of the tape.

Further in accordance with the invention, the system includes control means operatively coupled to the first and second programming sources for alternately switching the first and second programming sources between a first mode in which the first programming source is in the playback state and the second programming source is in a non-playback state, and a second mode in which the first programming source is in a non-playback state and the second programming source is in the playback state. Preferably, the control means includes synchronizing means for synchronizing at least one of the first and second digital signals relative to one another during switching between the first and second modes.

As implemented in the preferred embodiment, and with reference to FIG. 1A, the control means comprises a microprocessor controller 12, such as an 80286-model microprocessor chip from Intel. The synchronizing means of this embodiment comprises a synchro servo controller 14, such as known synchro servo controller components found in server mechanisms for 8 mm-based commercially available camcorders. The synchronizing means further includes a first digital synchronizer 16a operatively coupled to VCR1, and a second digital synchronizer 16b operatively coupled to VCR2. Digital synchronizers 16a and 16b preferably are identical components, each comprising, for example, a Nova Sync3, Nova Systems, Canton, Conn.

Controller 12 is coupled by a bus 18 at an input/output port 12a to receive commands from and issue status signals to bus 18. Bus 18 is coupled to a user interface panel (not shown). The output of controller 12 is coupled by a data bus 20 to synchro servo controller 14.

The preferred embodiment further includes a four-channel digital multiplexer and demultiplexer (MUX/DEMUX) 22, the construction of which is illustrated in the block diagram of FIG. 1B. MUX/DEMUX 22 includes a four-to-one multiplexer 24, a two-to-one multiplexer 26, a forward error correction (FEC) circuit 28, a sync insert circuit 30, a one-to-four demultiplexer 32, an inverse forward error correction (FEC$^{-1}$) circuit 34, and a sync remove circuit 36. Controller 12 is coupled via bus 20 to multiplexer 24, multiplexer 26, sync insert circuit 30, demultiplexer 32, and sync remove circuit 36. VCR1 synchronizer 16a is coupled via a line A to multiplexer 26 and sync remove circuit 36. VCR1 is coupled via a line B to sync insert circuit 30 to receive video signals from sync insert circuit 30. Similarly, VCR2 is coupled via a line C to sync insert circuit 30 to receive video signals from it. VCR2 synchronizer 16b is coupled via a line D to multiplexer 26 and sync remove circuit 36. Multiplexer 24 and demultiplexer 32 are coupled to a four-channel digital input/output interface or port 38. This interface typically would be coupled to a cable broadcast distribution network for broadcasting signals outputted from MUX/DEMUX 22 to subscribers. Alternatively, interface 38 may be coupled to another signal source such as a VCR for inputting video signals into MUX/DEMUX 22 to record the video signals onto one or both of VCR1 or VCR2.

In the record portion of MUX/DEMUX 22, denoted in FIG. 1B by the "r" symbol, multiplexer 24 is coupled at an output to multiplexer 26. Multiplexer 26 is coupled at its output to FEC circuit 28, which in turn is coupled at its output to sync insert circuit 30. In the playback portion of MUX/DEMUX 22, denoted in FIG. 1B by the "p" symbol, sync remove circuit 36 is coupled at its output to FEC$^{-1}$ circuit 34, which in turn is coupled at its output to demultiplexer 32.

There are two features which enable digital video system 10 to provide a continuous output signal corresponding to a continuous playback of programming. One feature is the control means, which alternately switches VCR1 and VCR2 to the playback state so that one of the decks is in playback state at all times when broadcasting is desired. The second feature is the construction of the first and second digital signals, and the system configuration that enables them to be played back sequentially back-to-back so that, together, they provide continuous programming to subscribers. This second feature preferably is provided by prerecording the first and second digital signals onto separate and respective first and second recording media, such as video recording tapes, laser disks, and the like.

In accordance with the invention, the digital video system preferably further includes a first recording medium for storing the first digital signal in recorded form, the first recording medium being readable by the first programming source to play back the first digital signal, and a second recording medium for storing the second digital signal in recorded form, the second recording medium being readable by the second programming source to play back the second digital signal.

As implemented in the preferred embodiment, the first recording medium comprises a digital video magnetic recording tape of known design, but prerecorded to store the first digital signal, as described in detail below. Similarly, the second recording medium comprises a digital video magnetic recording tape identical to the first tape, but upon which the second digital signal is prerecorded and stored.

To perhaps better explain the invention, the illustrative digital video system of the preferred embodiment uses three digital signals prerecorded on three respective video tapes. Any one of the three digital signals may be designated the "first digital signal," and the signal prerecorded on the next tape to be played back in sequence becomes the "second digital signal."

Figure 2:
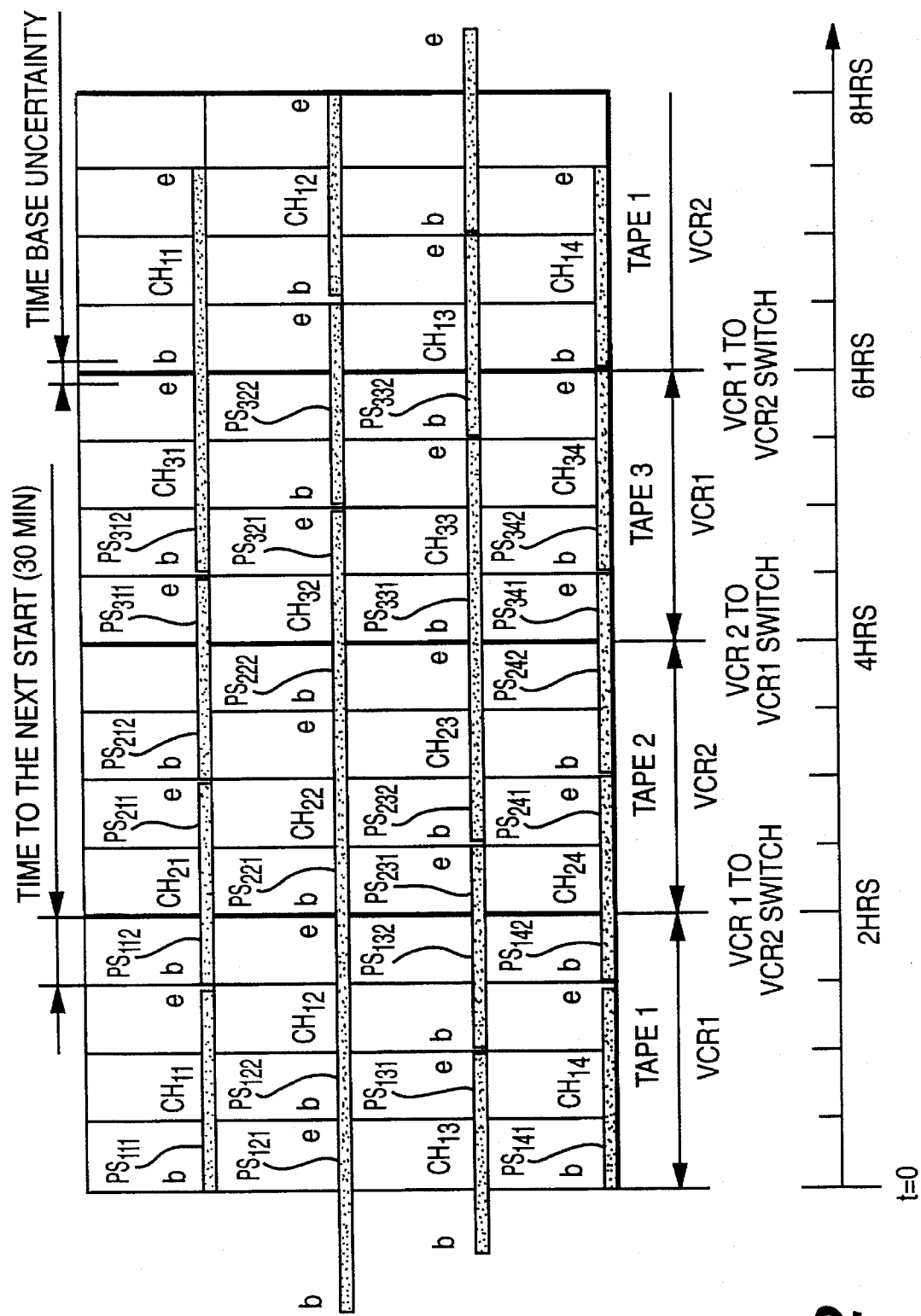
FIG. 2 is a diagram illustrating the programming recorded on digital video tapes for use with the preferred embodiment of FIGS. 1A and 1B and with the preferred playback method.

The construction of the three digital signals will now be described with reference to FIG. 2. As shown at the bottom of FIG. 2, movement from left to right in the figure corresponds to time. Each vertical line in the figure corresponds to 30 minutes, and each bold vertical line corresponds to two hours. As shown in the body of the figure, Tape 1 is played in VCR1 for the first two hours of broadcast time. Tape 2 then is played back by VCR2 for the second two hours of broadcast time. This is followed by playback of Tape 3 using VCR1. Tape 1 then is played back by VCR2, and so on. The sequential playback of Tapes 1, 2 and 3 can be played back indefinitely in this fashion, while alternating back and forth between VCR1 and VCR2. For purposes of describing the transition from Tape 1 to Tape 2, the programming recorded on Tape 1 comprises the first digital signal and the programming recorded on Tape 2 comprises the second digital signal. For purposes of describing the transition from Tape 2 to Tape 3, the programming recorded on Tape 2 comprises the first digital signal, and the programming Tape 3 comprises the second digital signal.

Considering first the transition from Tape 1 to Tape 2, the construction of the first digital signal as prerecorded on Tape 1 is shown in the left-most portion of FIG. 2, corresponding to the broadcast time between t=0 and t=2 hrs. The first digital signal includes four prerecorded channels, $CH_{11}$, $CH_{12}$, $CH_{13}$ and $CH_{14}$ (the first subscript denoting the tape and the second subscript denoting the channel). Each of the channels contains prerecorded programming that runs for the entire duration of Tape 1, i.e., two hours. Each of these first digital signal channels includes program segments. A program segment is a video segment of a program, which may comprise part or all of the program. For example, first digital signal channel $CH_{11}$ includes a first program segment $PS_{111}$ (the first subscript denoting the tape, the second subscript denoting the channel, and the third subscript denoting the program segment), and a program segment $PS_{112}$. Program segment $PS_{111}$ comprises an entire program which begins at the beginning of Tape 1, i.e., t=0 in FIG. 2, and ends at time t=1.5 hrs. Note in FIG. 2 that "b" denotes the beginning of a program, and "e" denotes the end of a program. Program segment $PS_{112}$ begins at time t=1.5 hours and runs for 30 minutes, ending at the end of Tape 1. Note that program segment $PS_{112}$ constitutes only the first half hour of a 90 minute program and thus does not comprise an entire program.

The other channels of the first digital signal channels are similarly arranged. For example, program segment $PS_{121}$ of channel $CH_{12}$ comprises the last 30 minutes of a 90 minute program. Program segment $PS_{122}$ of channel $CH_{12}$ comprises a full program that begins 30 minutes into Tape 1 and ends at the end of Tape 1. Both program segments $PS_{131}$ and $PS_{132}$ of channel $CH_{13}$ comprise only portions of a program, and neither constitutes an entire program. Program segments $PS_{141}$ and $PS_{142}$ of channel $CH_{14}$ correspond in position and length to program segments $PS_{111}$ and $PS_{112}$ of channel $CH_{11}$.

The second digital signal as prerecorded on Tape 2 is similarly arranged, although the specific programming is different from Tape 1. More specifically, the second digital signal comprises four channels $CH_{21}$, $CH_{22}$, $CH_{23}$, and $CH_{24}$. Each of these second digital signal channels corresponds to one of the first digital signal channels, i.e., channels $CH_{11}$ and $CH_{21}$, channels $CH_{12}$ and $CH_{22}$, channels $CH_{13}$ and $CH_{23}$, and channels $CH_{14}$ and $CH_{24}$. Channel $CH_{21}$ includes program segments $PS_{211}$ and $PS_{212}$, both of which comprise less than an entire program. Channel $CH_{22}$ comprises program segments $PS_{221}$ and $PS_{222}$. Program segment $PS_{221}$ comprises an entire 90 minute program starting at the beginning of Tape 2, whereas program segment $PS_{222}$ comprises only the first 30 minutes of a program. Channel $CH_{23}$ of Tape 2 comprises program segments $PS_{231}$ and $PS_{232}$. Channel $CH_{24}$ comprises program segments $PS_{241}$ and $PS_{242}$.

Tape 3 is configured similarly to Tapes 1 and 2. Specifically, Tape 3 includes four channels corresponding to the first digital signal channels of Tape 1 and the second digital signal channels of Tape 2. Each channel of Tape 3 includes program segments similar to those of Tapes 1 and 2, but the positioning of the program segments differs from those of the Tapes 1 and 2 program segments.

Selected ones of the first digital signal channels $CH_{11}$ through $CH_{14}$ comprise a first source program segment. A first source program segment is a program segment for a given tape that comprises less than an entire program, and which ends at the end of the recording medium. For example, for Tape 1, there are three first source program segments, i.e., program segments $PS_{112}$, $PS_{132}$, and $PS_{142}$. Each of these program segments ends at the end of Tape 1, and each segment comprises less than an entire program. Note that program segment $PS_{122}$ is not a first source program segment because it includes an entire program, even though it ends at the end of Tape 1.

Each of the tapes may include first source program segments, depending on the tapes that are being transitioned. For example, Tape 2 includes three first source program segments, i.e., program segments $PS_{212}$, $PS_{222}$, and $PS_{242}$. Tape 3 includes two first source program segments, i.e., program segments $PS_{322}$, and $PS_{332}$.

Selected ones of the second digital signal channels include a second source program segment. A second source program segment is a program segment that starts at the beginning of a recording medium and comprising less than an entire program. Tape 2 includes three second source program segments, i.e., $PS_{211}$, $PS_{231}$, and $PS_{241}$. Each of these program segments starts at the beginning of Tape 2 and comprises less than an entire program. Note that program segment $PS_{221}$ is not a second source program segment because, although it starts at the beginning of Tape 2, it does not comprise less than an entire program.

For each of the selected corresponding first and second digital signal channels, the first and second source program segments, when played back sequentially, produce a continuous output signal corresponding to a continuous playback of one of the programs. For example, for the first channel of Tapes 1 and 2, first source program segment $PS_{112}$ of Tape 1 and second source program segments $PS_{211}$ of Tape 2, when Tape 2 is played back sequentially and immediately after playback of Tape 1, produce a continuous output signal corresponding to a continuous playback of the program recorded on channel 1 of these tapes and beginning at time t=1.5 hours and ending at time t=3 hours. Similarly for the third channel of Tapes 1 and 2, first source program segment $PS_{132}$ of Tape 1 and second source program segment $PS_{231}$ produce a continuous output signal corresponding to a continuous playback of one of the programs on the third channel when Tape 2 is played back sequentially and immediately after Tape 1. The same applies for the fourth channel for first source program segment $PS_{142}$ and second source program segment $PS_{241}$.

The Preferred Playback Method

In accordance with another aspect of the invention, a digital video playback method is provided for simultaneous playback of a plurality of programs. For ease of illustration, the presently preferred playback method according to this aspect of the invention will be described with reference to the preferred embodiment shown in FIGS. 1A and 1B. The playback method, however, may be carried out in other ways and therefore is not limited to this preferred system embodiment.

In accordance with the invention, the playback method includes a first step of outputting a first digital signal from a first programming source when the first programming source is in a playback state. The first digital signal comprises a plurality of channels, and selected ones of the first digital signal channels include a first source program segment.

As implemented in the preferred playback method, this first step comprises playing back Tape 1 using VCR1. Tape 1 is prerecorded as shown in FIG. 2 and as described above with reference to FIG. 2. Accordingly, playback of Tape 1 by VCR1 when in its playback state results in outputting from VCR1 a first digital signal which comprises a time-division-multiplexed, four-channel video signal including channels $CH_{11}$, $CH_{12}$, $CH_{13}$, and $CH_{14}$. Each of these channels includes the programming depicted in the Tape 1 portion of FIG. 2. Selected ones of the first digital signal channels include a first source program segment. As explained above with reference to FIG. 2, Tape 1 includes three first source program segments, i.e., program segments $PS_{112}$, $PS_{132}$, and $PS_{142}$. First source program segments $PS_{132}$ is included in the first digital signal from time t=1 hour to t=2 hrs. Program segments $PS_{112}$ and $PS_{142}$ are included in the first digital signal from time t=1.5 hrs to t=2 hrs.

With reference to FIG. 1A, the first digital signal outputted by VCR1 is communicated to VCR1 synchronizer 16a, from which it is outputted on line A to MUX/DEMUX 22. As shown in FIG. 1B, the first digital signal is communicated to sync remove circuit 36, which removes synchronization bits from the signal. The first digital signal, thus modified, then is communicated to $FEC^{-1}$ circuit 34, which removes forward error correction coding. The first digital signal as outputted from $FEC^{-1}$ circuit 34 is communicated to demultiplexer 32, which demultiplexes the signal into four separate output signals, each output signal corresponding to one of the four channels of the first digital signal. These four output signals then are communicated, for example, to the cable distribution network which broadcasts these signals as programming to subscribers.

Further in accordance with this aspect of the invention, the method includes a second step of outputting a second digital signal from a second programming source when the second programming source is in a playback state. The second digital signal comprises a plurality of channels corresponding to the first digital signal channels, and selected ones of the second digital signal channels corresponding to the selected first digital signal channels include a second source program segment. For each of the selected corresponding first and second digital signal channels, the first and second source program segments, when played back sequentially, produce a continuous output signal corresponding to a continuous playback of one of the programs.

The playback method of the invention further includes a third step of alternately switching the first and second programming sources between a first mode in which the first programming source in the playback state and the second programming source is in a non-playback state, and a second mode in which the first programming source is in a non-playback state and the second programming source is in the playback state. This third step preferably comprises synchronizing the first and second digital signals during switching between the first and second modes.

Referring again to the preferred playback method, the playback of Tape 1 in VCR1 as described immediately above comprises the first mode. During this first mode, VCR1 is in the playback state and VCR2 is in a non-playback state. Tape 2 is in VCR2, rewound to its beginning, and ready to be played back.

In this preferred playback method, the third step is performed as the first step is completed, and immediately prior to performance of the second step. More specifically, as Tape 1 nears its end, a flag inserted in the data during recording is sensed by synchro servo control 14 and controller 12. In response, controller 12 issues a synchronization command via bus 20 to synchro servo controller 14 (FIG. 1A), and to sync remove circuit 36 and demultiplexer 32 of MUX/DEMUX 22 (FIG. 1B). This synchronization command causes synchro servo controller 14 to switch VCR2 from the non-playback state to the playback state at a time relative to the remaining play time of Tape 1 in VCR1 so that the beginning of the programming on Tape 2 will begin simultaneously with the end of the programming on Tape 1. Synchro servo control 14 preferably performs this function using a feedback-based system that regulates the motor driving the tape based in part on tape speed. In transitioning from Tape 1 to Tape 2, it is difficult and expensive to provide a synchro servo controller that will provide a perfectly synchronized transition. Some time base uncertainty typically arises. Accordingly, one or both of VCR1 and VCR2 synchronizers 16a and 16b are used to provide frame-to-frame synchronization between the ending of Tape 1 and the beginning of Tape 2. These synchronizers operate in a known manner to synchronize the sequential frames at the beginning of Tape 2 with corresponding sequential frames at the end of Tape 1. Once this synchronization is achieved, the signals from VCR1 and VCR2 synchronizers 16a and 16b as received at sync remove circuit 36 are identical. Sync remove circuit 36 then acts as a switch to communicate the second digital signal from VCR2 synchronizer 16b on to $FEC^{-1}$ circuit 34. The second digital signal then is communicated to demultiplexer 32, which demultiplexes it into four separate output signals that are outputted to the distribution network. Once the transition from VCR1 and Tape 1 to VCR2 and Tape 2 is complete, synchro servo controller 14 communicates a command to VCR1 to switch it to its non-playback state. VCR1 at this time may be switched to a rewind state to rewind Tape 1.

Upon completion of the transition from the playback of Tape 1 to the playback of Tape 2, the transition is completed from the first mode to the second mode in which VCR1 is in its non-playback state and VCR2 is in its playback state.

The second step of the preferred playback method is performed upon the switching of VCR2 to its playback state to play back Tape 2, as described above. During this playback state, VCR2 outputs a second digital signal comprising the four channels of Tape 2 corresponding to the four channels of Tape 1. These four channels and the prerecorded programming comprising these channels is as shown for Tape 2 in FIG. 2. Selected ones of the second digital signal channels ($CH_{21}$, $CH_{23}$, and $CH_{24}$) corresponding to the selected first digital signal channels ($CH_{11}$, $CH_{13}$, and $CH_{14}$) include a second source program segment ($PS_{211}$, $PS_{231}$, and $PS_{241}$). For each of these selected corresponding first and second digital signal channels, the first and second source program segments ($PS_{112}$ and $PS_{211}$, $PS_{132}$ and $PS_{231}$, and $PS_{142}$ and $PS_{241}$), when played back sequentially, produce a continuous output signal at the output of MUX/DEMUX 22 corresponding to a continuous playback of the respective program that each of these program segment pairs comprise. This occurs at the transition from playback of Tape 1 to playback of Tape 2.

The playback of Tape 2 by VCR2 continues for approximately two hours, from time t=2 hrs to t=4 hrs. Just before the completion of Tape 2 playback, the third step of the preferred method is repeated to transition playback from VCR2 to VCR1. This occurs in essentially the same fashion as the earlier transition from VCR1 to VCR2. At this transition period, VCR1 is loaded with Tape 3, which has been rewound to its beginning. The programming of Tape 3 is as shown for Tape 3 in FIG. 2. For purposes of considering the transition from VCR2 and Tape 2 to VCR1 and Tape 3, the programming recorded on Tape 2 is considered to be the recorded form of the first digital signal, and the programming on Tape 3 is considered to be the recorded form of the second digital signal.

As the end of Tape 2 nears, a flag inserted in the recorded data is sensed by synchro servo control 14 and controller 12, as described above. Synchro servo controller 14, under the command of controller 12, causes VCR1 to be switched to its playback state. The switching of VCR1 to its playback state is controlled so that the initial video frames of Tape 3 are outputted from VCR1 to correspond as nearly as possible to the output of the corresponding frames at the end of Tape 2 as outputted from VCR2. As explained above, some time base uncertainty typically is involved. Accordingly, one or both of VCR1 and VCR2 synchronizers 16a and 16b is used to adjust the timing of the frames so that the frames of Tape 1 outputted by VCR1 are synchronized with the corresponding frames at the end of Tape 2 as outputted from VCR2. When this synchronization is achieved, the first digital signal from VCR2 synchronizer 16b and the second digital signal from VCR1 synchronizer 16a as received at sync remove circuit 36 are identical. Upon this synchronization, sync remove circuit 36 switches its output from the first digital signal (from Tape 2 and VCR2) to the second digital signal (from Tape 3 and VCR1). Sync remove circuit 36 removes the synchronization bits from the second digital signal and communicates the resultant signal to $FEC^{-1}$ circuit 34. $FEC^{-1}$ circuit 34 removes forward error correction coding and outputs the resultant signal to demultiplexer 32, which demultiplexes the signal into four separate output signals for output, for example, to the cable distribution network. Tape 3 is then played back from time t=4 hrs to t=6 hrs. At the completion of Tape 3, Tape 1 may again be played back using VCR2. The transition from VCR1 and Tape 3 to VCR2 and Tape 1 occurs in the manner described above for the transition from VCR1 and Tape 1 to VCR2 and Tape 2. This process of switching from VCR1 to VCR2 and vice versa can be continued indefinitely to continuously provide the programming on Tapes 1, 2 and 3.

The Recording Method

In accordance with another aspect of the invention, a method is provided for recording n channels of data on a digital recording medium. This method is extremely useful for recording multiple-channel digital video signals on recording media so that the data for the respective channels is interleafed sequentially. This type of interleafed digital video format is particularly suitable for use in the preferred embodiment of FIGS. 1A and 1B and in the preferred playback method, although the recording method is not limited to these applications.

The digital recording medium preferably comprises a digital magnetic recording tape. It includes a plurality of frames, with each of the frames including n channel slots, with n being a variable that can assume positive integer values corresponding to the number of channels.

This aspect of the invention will be described in connection with a presently preferred recording method according to the invention. In the preferred recording method, the digital recording medium is a digital magnetic video recording tape. The frames of video data include four channels (n=4) which, in accordance with the symbol conventions used above, are denoted $CH_1$, $CH_2$, $CH_3$, and $CH_4$, respectively. A single index is used to denote the channel, it being understood that single index channels refer to the channels of Tape 4. For simplicity and ease of illustration, the preferred recording method will be described as being carried out using the preferred embodiment of FIGS. 1A and 1B. The recording method according to this aspect of the invention is not, however, limited to use with this preferred system embodiment.

Figure 3:
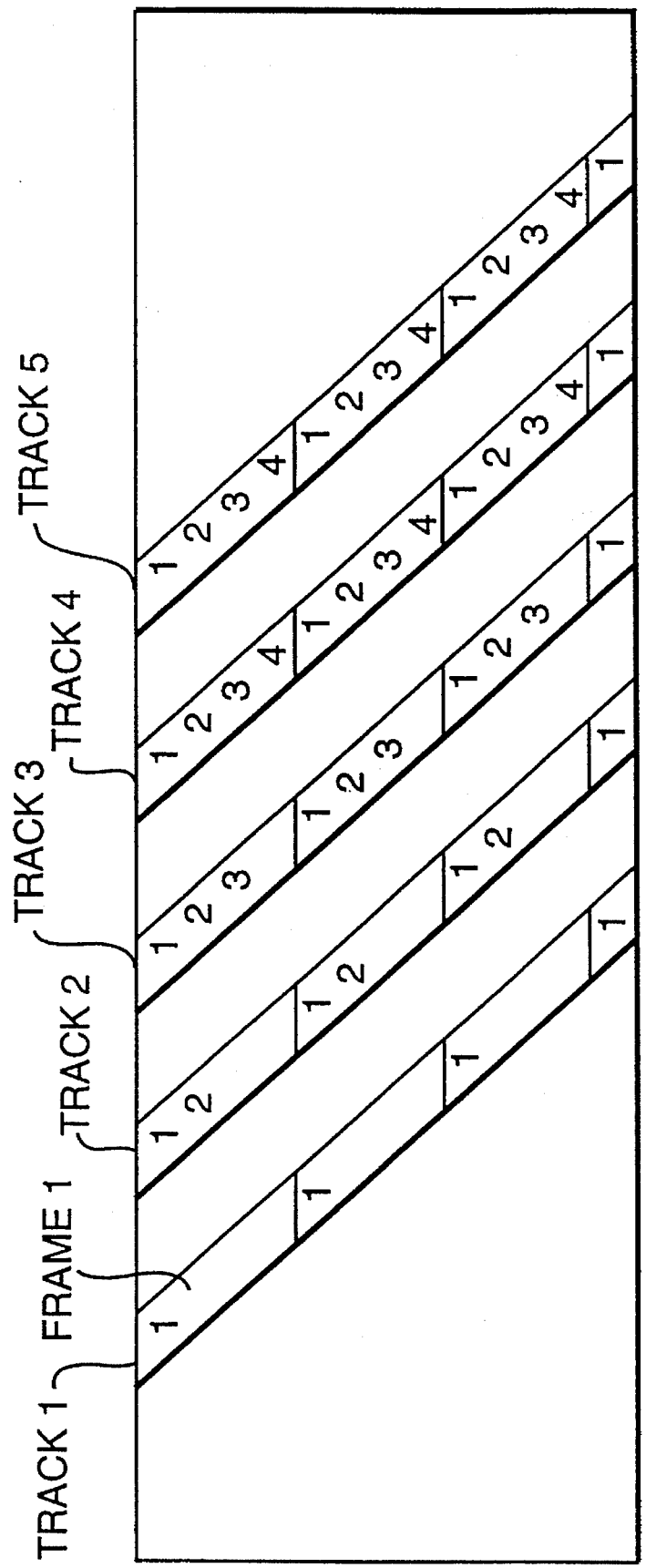
FIG. 3 is a diagram of a digital recording tape used to illustrate the preferred recording method according to the invention for recording multiple channels of data.

In the preferred recording method, the four channels of programming on Tape 1 (FIG. 2) will be recorded onto a digital recording tape identified as Tape 4. Tape 4 uses diagonal recording tracks, and its format consists of a plurality of frames recorded on each diagonal track. Each frame includes data for the four channels, with each channel being interleafed sequentially. This is illustrated in FIG. 3, which depicts Tape 4 with four of the diagonal recording tracks on it. The fourth (right most) recording track shows the tape configuration when fully recorded with the four channels of data in each frame. The first three tracks show the configuration of the tape at various stages as the preferred recording method is carried out. Each of these stages will be described in detail below.

In accordance with this aspect of the invention, the recording method includes a first step of recording a first channel $CH_i$ of data in a first channel slot of each of the frames of the recording medium. This index i is a positive integer variable that indicates the channel number of interest.

As implemented in the preferred recording method, this first step comprises recording the first channel $CH_1$ of Tape 1 (FIG. 2) onto Tape 4. With reference to the fourth track of Tape 4 in FIG. 3, each frame of data has a slot for each of the four channels. The slots for $CH_1$ are indicated by the "1" in each frame. This first step involves recording the digital video data for channel $CH_1$ of Tape 1 (program segments $PS_{111}$ and $PS_{112}$) into these channel $CH_1$ slots for each frame of Tape 4.

The specific manner for carrying out this first step of the preferred method can be explained with reference to FIGS. 1A and 1B. A digital VCR deck VCR3 (FIG. 1B) identical to VCR1 and VCR2 is used as the source for the programming on Tape 1.

VCR3 is coupled to port 38 of MUX/DEMUX 22 so that it is in direct communication with multiplexer 24. A compression encoder 40 is coupled in series between VCR3 and multiplexer 24 to compress the signal outputted by VCR3 before it is inputted into multiplexer 24. Compression of the signal by compression encoder 40 is performed in a manner known to those with ordinary skill in the art.

The signal received at multiplexer 24 includes only channel $CH_{11}$ data. Multiplexer 24 multiplexes this $CH_{11}$ data with the three other channels, which contain no data, to obtain a four-to-one multiplexed output signal that comprises the channel $CH_{11}$ data in the first channel slot and blank data in the slots for channels $CH_2$, $CH_3$, and $CH_4$, essentially as shown in the first recording track of Tape 4 (FIG. 4).

The multiplexed signal outputted by multiplexer 24 is communicated to multiplexer 26. The function of multiplexer 26 is primarily to combine data previously recorded on Tape 4 during this recording method, as will be described with regard to subsequent parts of this method. At this stage, data has not yet been recorded onto Tape 4. Accordingly, multiplexer 26 essentially adds to the signal from multiplexer 24 the null data from Tape 4 (VCR1) and outputs the same signal that was outputted from multiplexer 24.

The signal outputted from multiplexer 26 is communicated to FEC circuit 28, which performs forward error correction in a manner known to those of ordinary skill in the art. The output of FEC circuit 28 is communicated to sync insert circuit 30, which inserts synchronization coding into the frames of the signal and switches the output to VCR1 via line B. As shown in FIG. 1A, this signal is received at VCR1, where it is recorded in the first channel slots of each of the frames of Tape 4.

The recording method of the invention also includes a second step of recording a sequential one of the channels $CH_{i+1}$ of data in a sequential channel slot of each of the frames of the recording medium. The second step includes a first substep of reading the recording medium to obtain i previously recorded channels, a second substep of inserting the sequential channel $CH_{i+1}$ into the i previously recorded channels to obtain i+1 sequential channels, and a third substep of recording the i+1 sequential channels in the corresponding i+1 sequential channel slots of the frames of the recording medium. This second step is repeated until all n channels have been recorded.

The second step according to the preferred recording method involves sequentially recording the data for channels $CH_{12}$, $CH_{13}$, and $CH_{14}$ onto Tape 4, one channel at a time. Therefore, step two is carried out three times in this example.

In the first round of the second step, compression encoder 40 is coupled to the second channel of port 38 at MUX/DEMUX 22 so that multiplexer 24 receives this second channel data as its input. As VCR3 provides the second channel ($CH_2$) data to multiplexer 24, Tape 4 is read, or played back, from VCR1 so that the prerecorded signal (the first recorded track of Tape 4 in FIG. 3) is communicated to multiplexer 26. Multiplexer 26 multiplexes the channel two ($CH_{12}$) data from multiplexer 24 with the channel one ($CH_1$) data from VCR1 (Tape 4) to produce a multiplexed output signal that includes interleafed channel $CH_1$ and $CH_2$ data in each frame, essentially as shown in the second recording track of FIG. 3.

The multiplexed signal outputted by multiplexer 26 is communicated to FEC circuit 28, then to sync insert circuit 30, and on to VCR1, as described above for the first step of this method. The resultant recording on Tape 4 is essentially as shown in the second recording track from the left in FIG. 3.

The second iteration of the second step is carried out to add channel three ($CH_3$) data to the first and second channel data on Tape 4. This iteration is carried out in the same manner as the first iteration. The output of compression encoder 40 is coupled to the third channel of MUX/DEMUX port 38 so that channel three ($CH_{13}$) data is inputted to multiplexer 24. Multiplexer 26 combines this channel three data with the previously recorded channel one and two data from VCR1 to output a signal essentially as shown in the third recording track in FIG. 3. This signal then is communicated through FEC circuit 28, sync insert circuit 30, and on to VCR1 where it is recorded as shown for track 3 of Tape 4.

The third interaction of the second step for adding channel four ($CH_4$) data is carried out in the same manner. The output of compression encoder 40 is coupled to the fourth channel of MUX/DEMUX port 38 so that channel four ($CH_{14}$) data is inputted to multiplexer 24. Multiplexer 26 combines this channel four data with the previously recorded channel one, two and three data from VCR1 to output a signal essentially as shown in track 4 in FIG. 3. This signal then is communicated through FEC circuit 28, sync insert circuit 30, and on to VCR1 where it is recorded as shown for track 4 of Tape 4. The resultant recording on Tape 4 (track 4) duplicates the programming for Tape 1 as shown in the left-most portion of FIG. 2.

The recording method is not limited to recording using VCR1. For example, the same recording method could be carried out using VCR2. The only changes in the method would be the playback and recording of Tape 4 from VCR2, which would involve multiplexer 26 receiving input from VCR2 synchronizer 16b instead of VCR1 synchronizer 16a, and communication of the signal from sync insert circuit 30 to VCR2 instead of VCR1.

Other embodiments and methods will be apparent to those skilled in the art from consideration and practice of the invention disclosed herein. For example, other components and arrangements for the control means and synchronization means are possible within the scope of the invention. The dual synchronizer arrangement using synchronizers 16a and 16b may be replaced by an arrangement in which a combined or single synchronizer is used to synchronize one VCR output signal to the other VCR output signal. The description of the preferred embodiment and playback method above used a three tape and two VCR arrangement, but a two tape and two VCR arrangement, for example, also could be used. There is flexibility in the number of tapes and VCRs that could be used. In addition, there is flexibility in the number of channels (n) that can be accommodated by the invention. It is intended that the specification and examples be considered as exemplary only, with a true scope of the invention being indicated by the following claims.

What is claimed is:

1. A digital video system for simultaneous playback of a plurality of programs, the system comprising:

a first programming source for outputting a first digital signal when the first programming source is in a playback state the first digital signal comprising a first plurality of channels, selected ones of the first digital signal channels including a first source program segment;

a second programming source for outputting a second digital signal when the second programming source is in a playback state, the second digital signal comprising a second plurality of channels corresponding to the first digital signal channels, selected ones of the second digital signal channels corresponding to the selected first digital signal channels and including a second source program segment;

for each of the selected corresponding first and second digital signal channels, the first and second source program segments, when played back sequentially, producing a continuous output signal corresponding to a continuous playback of one of the programs;

control means operatively coupled to the first and second programming sources for alternately switching the first and second programming sources between a first mode in which the first programming source is in the playback state and the second programming source is in a non-playback state, and a second mode in which the first programming source is in a non-playback state and the second programming source is in the playback state; and means for separating the first digital signal into the first plurality of channels, and for separating the second digital signal into the second plurality of channels.

2. A digital video system as recited in claim 1, wherein the first and second programming sources comprise digital video cassette recorder devices.

3. A digital video system as recited in claim 1, wherein the control means includes synchronizing means for synchronizing at least one of the first and second digital signals relative to one another during the switching between the first and second modes.

4. A digital video system as recited in claim 3, wherein the synchronizing means comprises:

a synchro-servo controller for switching the second programming source to the playback state at a time relative to a remaining play time on the first digital signal so that the second digital signal will begin playback simultaneously with an end of the first digital signal; and a frame-to-frame synchronizer to synchronize a sequential portion of the second program segment with a corresponding sequential portion of the first program segment.

5. A digital video system as recited in claim 1, further including:

a first recording medium for storing the first digital signal in recorded form, the first recording medium being readable by the first programming source to play back the first digital signal; and a second recording medium for storing the second digital signal in recorded form, the second recording medium being readable by the second programming source to play back the second digital signal.

6. A digital video system as recited in claim 1, wherein at least two channels in each digital signal include a program and a program segment.

7. A digital video system as recited in claim 6, wherein at least one channel in each digital signal includes at least two program segments.

8. A digital video system as recited in claim 7, wherein each program and program segment has a beginning time, and the beginning time of a program on a first channel is staggered with respect to a beginning time of a program on a second channel.

9. A digital video system as recited in claim 1, wherein said control means further is for directing the respective programming source in the non-playback state to rewind.

10. A digital video playback method for simultaneous playback of a plurality of programs, the method comprising:

outputting a first digital signal from a first programming source when the first programming source is in a playback state, the first digital signal comprising a first plurality of channels, selected ones of the first digital signal channels including a first source program segment;

outputting a second digital signal from a second programming source when the second programming source is in a playback state, the second digital signal comprising a second plurality of channels corresponding to the first digital signal channels, selected ones of the second digital signal channels corresponding to the selected first signal channels including a second source program segment;

for each of the selected corresponding first and second digital signal channels, the first and second source program segments, when played back sequentially, producing a continuous output signal corresponding to a continuous playback of one of the programs;

alternately switching the first and second programming sources between a first mode in which the first programming source is in the playback state and the second programming source is in a non-playback state, and a second mode in which the first programming source is in a non-playback state and the second programming source is in the playback state; and separating the first digital signal into the first plurality of channels when the first programming source is the playback state, and separating the second digital signal into the second plurality of channels when the second programming source is in the playback state.

11. A digital video playback method as recited in claim 10, wherein the third step comprises synchronizing the first and second digital signals during switching between the first and second modes.

* * * * *